Feb. 19, 1957 R. E. VON HAGEL ET AL 2,781,838
MACHINE AND METHOD FOR PRODUCING FOAM GLASS SHAPES
Filed May 27, 1953 2 Sheets-Sheet 1
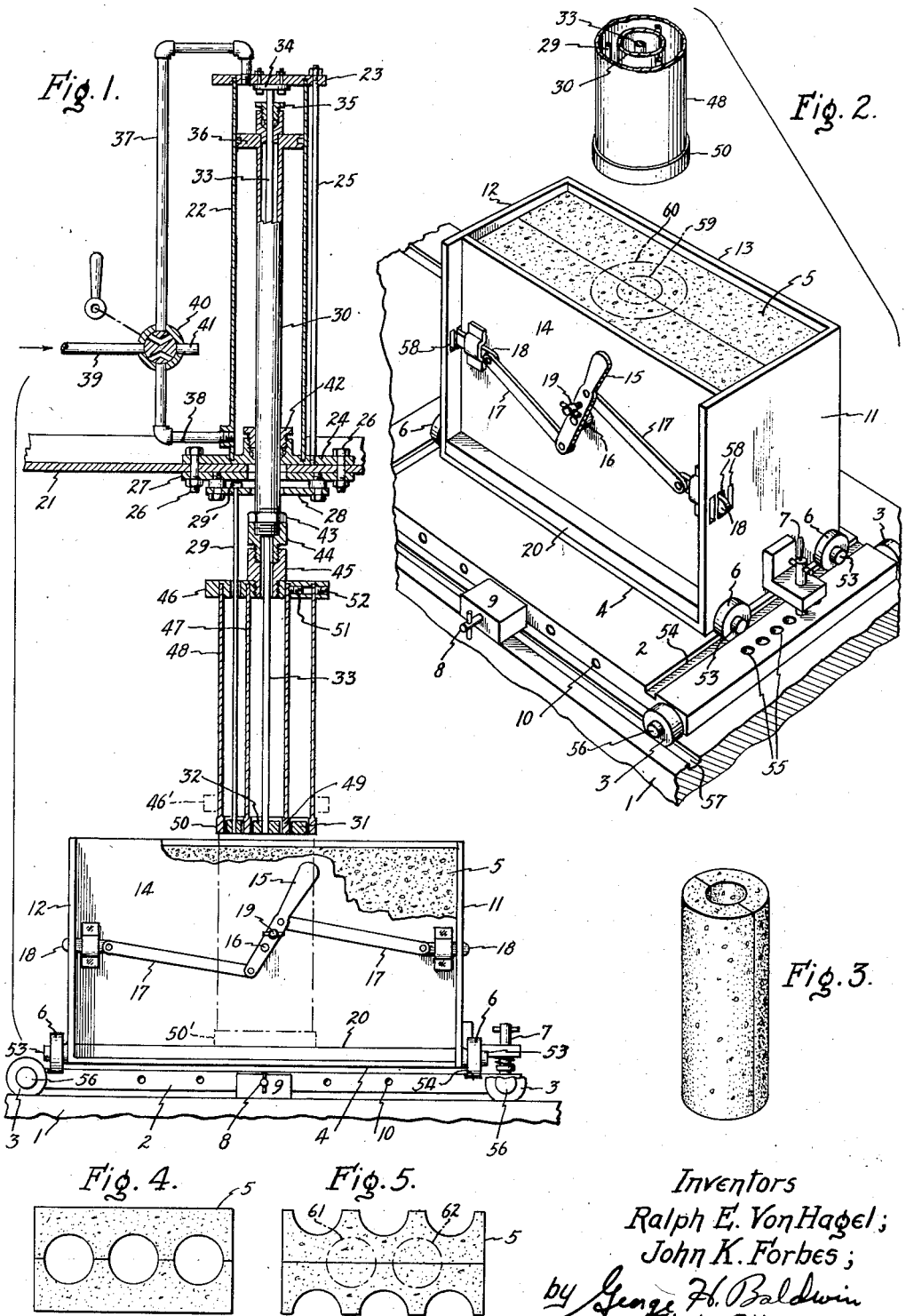
Inventors
Ralph E. Von Hagel;
John K. Forbes;
by George H. Baldwin
Their Attorney

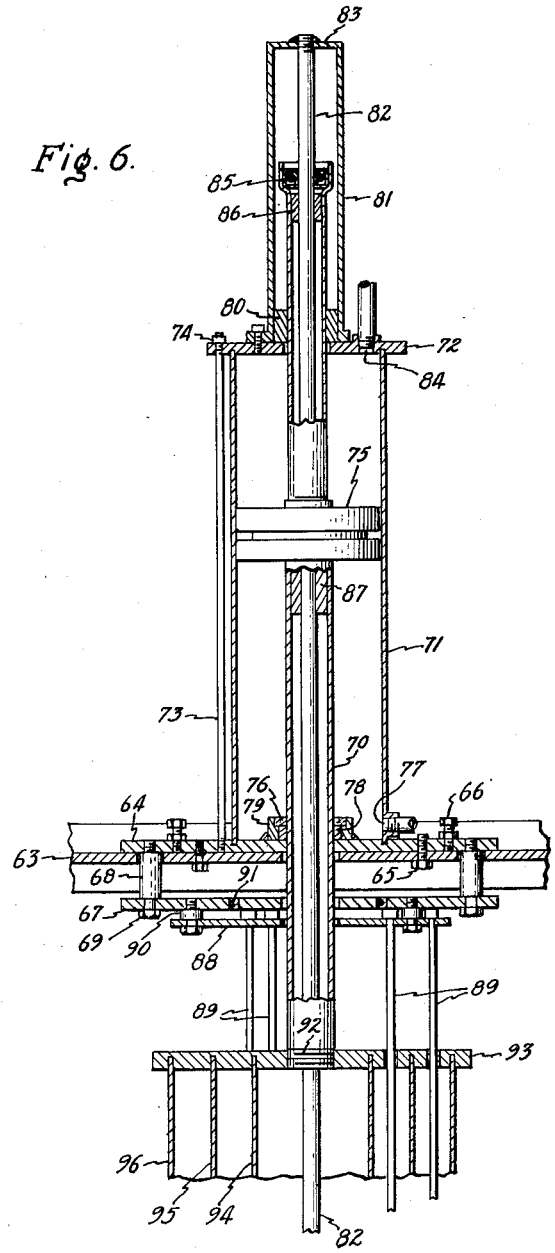

United States Patent Office 2,781,838
Patented Feb. 19, 1957

2,781,838

MACHINE AND METHOD FOR PRODUCING FOAM GLASS SHAPES

Ralph E. Von Hagel and John K. Forbes, Jacksonville, Fla.

Application May 27, 1953, Serial No. 357,878

7 Claims. (Cl. 164—18)

This invention relates to a machine and method for producing rectilinear shapes of brittle, cellular glass material of the type used for heat insulation. The material is in the form of small bubbles of glass forming a brittle foam or sponge-like structure, having a specific gravity of about one-twentieth of that of solid glass, entrapped air or gas comprising most of the volume. This material is herein referred to as foam glass. This invention has particular applicability to a machine and method for producing split, hollow cylindrical sleeve sections for use in insulating pipe.

Heretofore, foam glass pipe insulating sleeve sections have been fabricated from rectangular blocks of material sawed into blanks proportioned in accord with the final size of the desired shape. Such rectangular blanks have been cut and ground into the desired shapes, with excessive waste. More specifically, if a hollow split cylinder with one inch thick walls was desired for insulating a pipe or tube having an outside diameter of 5½ inches, two rectangular blanks approximately 4 inches by 8 inches in cross section would be prepared. Each blank would be brought into contact with a revolving mandrel faced with sandpaper, or the like, and a longitudinal groove would be ground by the mandrel in one of the two largest faces of the blank. The grinding would continue until the groove in each blank was semi-cylindrical, the radius of the groove being 2¼ inches. All of the material ground away to form the grooves would thus be reduced to waste powder or granules, and the amount so lost from grinding the two blanks, in the example, would equal a 5½ inch diameter cylinder of the length of the blanks. Following the grinding of the grooves, the blanks would be turned in a lathe and material would be cut from the ungrooved major face to form a semi-cylindrical surface on each blank having a radius of about 3¼ inches. In each of these operations, an uneconomic loss of material has been inherent, and the process has been slow and costly, requiring expensive equipment and expensive abrasives or cutting tools, or both, requiring considerable labor, and resulting in a relatively high rate of breakage. The process further has required the preliminary preparation of relatively small rectangular blanks from the larger standard size blocks of the material.

The fragility and extreme brittleness of the foam glass material makes undesirable forming operations of several steps, since each step increases the danger of breakage.

It is, accordingly, an object of this invention to provide a machine for forming foam glass split cylinders quickly and inexpensively.

It is a specific object of this invention to provide a machine capable of forming rectilinear foam glass shapes at a single operation.

A further specific object of this invention is to provide a machine for punching split hollow cylinders of foam glass material from pairs of rectangular blocks of the material in a manner to provide minimum waste.

It is an important additional object of this invention to provide a method of forming rectilinear shapes of foam glass material quickly and with a minimum of complicated apparatus, minimum loss due to breakage, and with maximum utilization of material.

The novel features which we believe to be characteristic of our invention are set forth with particularity in the appended claims. Our invention itself, however, both as to its organization and method of operation, together with further objects and advantages thereof, may best be understood by reference to the following description taken in connection with the accompanying drawings, in which:

Fig. 1 is a front elevation of a machine in accord with this invention, partially broken away to disclose details of the construction;

Fig. 2 is a perspective exploded view of a portion of the machine demonstrating certain details and indicating the method involved;

Fig. 3 is a perspective view of a split hollow cylindrical shape such as may be formed as the end product of the machine operation and method of this invention;

Fig. 4 and Fig. 5 are top views of blocks of the material from which hollow cylinders have been cut and demonstrating the preferred method of maximum material utilization; and Fig. 6 is a front elevation of a partially broken away portion of a modified machine in accord with this invention.

Referring to Fig. 1 of the drawings, the machine comprises a main base member 1 which carries a movable sub-base 2, having a wheel or roller 3 at each corner. The sub-base 2, in turn, supports a table member 4 on which the blocks of foam glass material 5 rest during operation of the machine. The table member 4 carries a wheel 6 at each of its corners. The wheels 6 permit the table member 4 to be adjusted forwardly and backwardly on the sub-base 2, and a manually operated locking detent pin member 7 is provided to retain the table member 4 in a desired selected position on the sub-base 2. Sub-base 2 may be positioned selectively toward one or the other ends of the machine, rolling along base 1 on its wheels 3, and it may be locked in a selected position by means of manually operated detent pin 8, mounted to a projection 9 of base 1, and engaging in a selected one of detent openings 10 formed along the forward edge of the sub-base 2.

Table 4 comprises the lower portion of a box structure having upstanding end wall members 11 and 12, a back wall 13 and an adjustable and removable front wall 14. A clamping arrangement is provided on wall 14 which comprises a handle 15 pivotally attached at 16 to the wall, a pair of arms 17 and a catch member 18 at each side to engage in an opening in the respective end wall 11 or 12. A wing bolt 19 may thread through handle member 15 and engage against the surface of wall 14 to retain the handle in selected position. A heavy, inflexible, rigidly flat surfaced plate 20 rests upon the table member 4 and rigidly supports the lower faces of the blocks of material 5.

Above the table, and above the blocks 5 of material to be formed, a frame member 21 carries a compressed air cylinder 22. It will be understood that frame member 21 is connected by other suitable frame or supporting members to the base 1, and that base 1 and member 21 comprise integral portions of the fixed and rigid body or frame of the machine.

Cylinder 22 comprises a head closure 23 and a lower closure 24, each formed with a suitable annular groove into which the ends of the cylinder wall fit, and rods 25, of which there may be two or three, or more, interconnect the closure members 23 and 24 to hold the cylinder assembly together. Lower closure member 24 is bolted to frame member 21 by means of bolts 26, and the attachment means preferably includes a lower support plate 27 under frame member 21 and opposite closure member 24. In addition to the above mentioned normally stationary and fixed cylinder assembly elements, a stationary rod-retaining plate 28 is bolted below plate 27 and carries a plurality of downwardly extending ejector supporting rods 29 which have enlarged head portions 29' disposed between plates 27 and 28, the rods hanging freely from the respective head portions thereof through plate 28. Three or more rods 29 are preferably spaced equally around the piston rod 30. An annular ejector ring or plate 31 horizontally disposed and having an axis coincident with the extended axis of piston rod 30 is affixed to and supported by the lower ends of rods 29. The lower face of the ejector plate 31 is spaced only a short distance above the upper face of the blocks 5 which are to be operated upon, a spacing distance of a minor fraction of an inch, such as ⅛ to ¼ inch, being suitable. The clearance should be as little as is found practical under the particular circumstances, since the danger of breakage is decreased by closer spacing. An inner circular ejector plate 32 is disposed in fixed position preferably at the level of the annular plate 31. Plates 31 and 32 are preferably spaced, as suggested, only a short distance above the blocks 5, although it will hereafter appear that the spacing of inner plate 32 above the block is not so critical as the spacing of ring 31, and the machine will operate satisfactorily if plate 32 is disposed even several inches above the level of plate 31. The outer diameter of central ejector plate 32 will be seen to be substantially less than the inner diameter of the annular plate 31. The central plate 32 is attached for support to the lower end of an axial rod 33, and rod 33 extends vertically upwardly coaxially with and through piston rod 30 and coaxially of cylinder 22 to a point of attachment at the center of cylinder head 23. At this point of attachment, rod 33 may comprise an enlarged head 34 which is bolted to the cylinder head member 23 as shown.

The hollow piston rod 30 surrounds and moves along rod 33, and an airtight seal or packing arrangement is provided at the upper end of the piston rod which may comprise packing material compressed by a packing nut 35 into contact with the surface of rod 33, thus to seal off the interior of the piston rod from the interior of the upper end of cylinder 22. Piston 36 is mounted on piston rod 30 adjacent the upper end of the rod and serves to drive the piston rod up and down in response to the introduction of compressed air into one and the other ends of the cylinder through conduits 37 and 38, respectively, from supply conduit 39 under the control of manually operated valve 40. A source of compressed air is connected to conduit 39 but such source is not shown for the sake of simplicity. Valve 40 may be operated to admit compressed air to the upper end of cylinder 22 through conduit 37 and simultaneously to connect the lower portion of the cylinder interior through conduit 38 to an atmospheric exhaust 41, thereby to cause piston 36 and piston rod 30 to be forced downwardly. The valve 40 may also be operated into a neutral position, indicated in the drawings, in which conduits 37 and 38 are both closed. In this condition, the piston 36 normally will remain stationary. The valve may also be operated to admit compressed air under the piston and to connect conduit 37 to the exhaust 41, thereby to raise the piston 36.

The piston rod 30 passes through the lower cylinder closure plate 24, and suitable airtight packing around the piston rod is provided as at 42 to seal the cylinder below the piston.

The lower end of piston rod 30 is threaded externally to receive lock nut 43 and a collar member 44. The collar 44 threads onto the piston rod, and lock nut 43 is tightened downwardly against the collar to lock the collar firmly in place on the rod. A downwardly extending reduced portion of collar 44 is externally threaded to engage in the internally threaded upper bore of a second collar 45. The collars 44 and 45 may be exactly alike, or one of the collars may be longer than the other. The lower collar 45 carries a preferably round crushing cylinder mounting plate 46, the plate being threadedly engaged on the downward extending reduced portion of collar 45. It will be seen that each collar is vertically bored to slide freely on rod 33. The purpose of collars 44 and 45 is to act as removable extensions of the piston rod 30. While two such collars are shown, both collars may be omitted and plate 46 may be threaded directly to the end of piston rod 30, a lock nut 43 being then tightened directly, or with interposed lock washers, against the upper surface of the plate 46. The provision of collars permits the lowering of plate 46 with respect to the lower end of piston rod 30, and it will be apparent that the substitution of more collars or longer collars will increasingly lower the plate 46. Collars with relatively long reduced lower sections, which are externally threaded, will permit the next lower collar or plate 46 to be threaded more or less far onto the collar to permit small changes in plate height, and the collar may carry lock nuts to lock against the next lower member if desired.

Plate 46 has two concentric annular grooves in its lower face, and hollow crushing cylinders 47 and 48 are coaxially arranged to engage and to be held in the respective grooves. The inner wall surface of each crushing cylinder preferably fits closely the inner wall of its respective groove in order to retain the thin walled cylinder in circular shape and to resist any tendency of the upper end of the cylinder to become oval or to bend inwardly. The outer groove wall may fit against the outer cylinder wall in each case, but it is preferred that the diameter of the outer groove wall be slightly larger than the external diameter of the respective cylinder. The dimensions of each groove should be such as not to make difficult the insertion or removal of cylinders, and a sliding fit of the inner cylinder wall against the inner groove wall has been found most satisfactory.

The crushing cylinders of an operative embodiment of this invention are 14 inches in vertical length and are formed of cold rolled steel. The wall thickness of each cylinder is between about 20 and 25 thousandths of an inch throughout the major portion of each cylinder increasing, however, to a thickness of about 40 thousandths of an inch toward the lower end. The lower 3 inches of each cylinder may be increased to this latter thickness, and it has been found preferable that the extra thickness be provided by forming the 3 inch lower end portion of each cylinder with about 15 thousandths of an inch greater outside diameter and with about 15 thousandths of an inch less internal diameter than the main body portion. In use, the lower edge of each cylinder will wear and may split and curl forming a rough, uneven and rolled or burred lower edge. When it is discovered that the cylinder has become so badly worn or damaged at its lower edge that its tube forming function is impaired and that the shapes produced are not of acceptable quality, or are too often broken during forming, the cylinder or cylinders may be removed from the machine and the lower edges ground off. Such grinding of the cylinders, of course, reduces the length of the lower end portion of increased thickness, but it has been found that the efficiency of the machine is not appreciably reduced even when nearly all of the portion of increased thickness has thus been removed. The extreme lower edge of the forming cylinders should be blunt; they may be square and flat, or they may be rounded. After a short period of use, the edges will be found to be rounded, even though originally flat, but operation of the cylinders is satisfactory even when the edges become rounded, split, uneven and burred. When unsatisfactory operation of the cylinders is indicated by excessive breakage, malformation of the product, or the like, the edges of the cylinders should, of course, be repaired.

Referring again to Fig. 1, the lower end portion 49 of crushing cylinder 47 and the lower end portion 50 of crushing cylinder 48 are seen to be of increased thickness, increasing in thickness both inwardly and outwardly. The upper ends of the cylinders are engaged in the grooves of plate 46 and set screws 51 and 52 are provided to bear against the upper ends of the respective cylinders to hold the cylinders in place. The two set screws shown are threaded in sequence into an internally threaded horizontal bore extending radially into plate 46. Set screw 51 is introduced into the bore and set against cylinder 47 prior to the introduction of set screw 52 and prior to the positioning of the outer cylinder 48 in its groove. The outer cylinder and its set screw may be, then, readily applied. Several spaced radial bores and set screws may be provided in the plate 46, if desired, and at least two bores and sets of set screws are preferred.

The diameters of cylinders 47 and 48 will be determined by the dimensions of the split hollow cylindrical shapes which it is desired to form. In forming insulating sections for encasing 3 inch outside diameter pipe, for example, the external diameter of the lower portion 49 of inner cylinder 47 may be slightly greater than 3 inches, while the diameter of the outer cylinder may be 7 or 8 inches, depending upon the desired thickness of the insulating section which is to be formed. The dimensions of ejector ring 31 for any given diameters of cylinders 47 and 48 should be such that the external circumference of ring 31 is cleared by the internal circumference of enlarged portion 50 of the outer cylinder 48, while the internal circumference of the ejector ring must clear the external circumference of enlarged portion 49 of the inner cylinder 47. The dimensions of the inner ejector plate 32, similarly, are such that its external circumference clears the inner circumference of the enlarged lower end 49 of cylinder 47. While Fig. 1 of the drawings indicates that plate 46 has only two annular grooves, proportioned to receive only the two cylinders 47 and 48 of predetermined diameters, it will be understood that additional annular grooves may be provided in the plate to receive cylinders of other diameters. It will also be understood that ejector plates 31 and 32 may be replaced with plates of other dimensions to correspond to the dimensions of substituted cylinders which are of greater or less diameter.

Operation of the machine to form a split hollow cylindrical shape from the blocks 5 is accomplished by admitting compressed air to cylinder 22 above piston 36, by operation of valve 40, whereby piston 36 is driven downwardly and forces cylinders 47 and 48 into and through the blocks 5. At the end of the shape forming operation, plate 46 will have reached the position indicated in broken lines at 46', while the lower end portion 50 of the outer cylinder will have reached the position 50', the lower edge of each crushing cylinder having passed through the blocks 5 of cellular material and having reached a position against, or nearly against, the rigid flat surface of table member 20. The passage of the enlarged lower edges of the crushing cylinders through the material results in the crushing of the glass material immediately in advance of the lower cylinder edges as they pass downwardly. A substantial part of the crushed glass particles thus produced are deposited in the surfaces formed along the path of the edges, while the edges also carry ahead of them a small mass of crushed glass particles. These crushed particles which are not pushed back into the material along the paths of the downwardly progressing edges may be pushed down onto the surface of table 20 and may prevent the lower edges of the crushing cylinders from quite meeting the surface of table 20. The foam glass material, however, is found to be crushed and severed completely to the surface of the member 20, since the compacted mass of crushed glass particles below the cylinder edges at the bottom of the cut crushes all of the cellular material down to the table surface.

The cutting or crushing stroke may take place in about $\frac{1}{10}$ second, the blocks of material 5 being, characteristically, 1 foot in height and the corresponding cutting stroke, therefore, being approximately 12 inches. During the crushing stroke, it is most important that the blocks 5 be rigidly supported on a hard, flat surface. A sufficiently rigid surface has been found to be provided by member 20 comprising a block of marble, set upon a table 4 formed of ¼ inch steel. Unsatisfactory results will be had if the table surface on which the blocks 5 rest, under the crushing force of the downwardly moving cylinders, bends or sags by as much as a few thousandths of an inch, and the table surface, accordingly, should be rigidly flat, hard, and non-resilient, and it should be solidly mounted.

After the downward stroke of the cylinders 47 and 48, valve 40 is operated to admit compressed air under piston 36, thereby to cause the cylinders 47 and 48 to be withdrawn from the blocks of material. During the withdrawal, ejector plates 31 and 32 prevent the portions of the blocks 5 which have been severed by the cylinders from rising with the cylinders. The formed shapes, accordingly, are ejected from the rising cylinders and remain substantially in their original positions resting upon the surface of table member 20.

Fig. 2 shows certain details of the block-holding arrangement, and it will be seen that blocks 5 are disposed within an open top box structure comprising end walls 11 and 12, a back wall 13, and a movable front wall 14. The blocks 5 rest upon the rigidly flat, non-resilient table surface provided by plate 20, the plate 20 being of marble, as heretofore suggested, or of some other kind of stone, or concrete, for example. Other non-resilient and rigid materials may be found suitable for the plate 20, but it is important that the plate be flat, without upstanding projections which might concentrate forces on any one or more parts of the lower flat faces of the blocks 5. Small cavities in the surface of plate 20 are, generally, not important, since very little force concentration would be produced thereby. Of primary importance is the avoidance of any warping or sagging of the plate which would cause the edges, for example, to be more than a very few ten-thousandths of an inch above the central portion of the plate, and the plate must be sufficiently rigid not to sag in the center or at the ends or edges by more than about one or two thousandths of an inch under the most severe downward crushing force of the cylinders 47 and 48 which is contemplated.

While the plate 20 is shown and described as being a separate member resting on the table member 4, it will be understood that the member 4 may itself be sufficiently rigid and flat to provide the block-supporting table surface, or, in other words, the plate 20 may form the horizontal lower panel of the box-like structure in which the blocks 5 are placed.

Stub shafts 53 are seen to protrude from the ends of the box structure to form journals for rollers or wheels 6. The rollers 6 operate in a channel or track 54 formed in or on the upper surface of sub-base 2, permitting the box structure to be adjusted in forward and backward position on the sub-base. Detent pin 7 is attached to the block-carrying box structure and is engageable in a selected opening 55 in sub-base 2 to lock the box structure in desired position. The detent 7 and openings 55 may be duplicated at the end of the box structure outside wall 12 if desired.

Sub-base 2 is provided with journal members 56 each carrying a roller 3 adjacent each corner of the sub-base, and rollers 3 traverse tracks 57 in or on main base member 1 to permit selection of the box position toward the lateral ends of the machine. Spring loaded detent pin 8 attached, through protrusion 9, to base 1 engages selectively in openings 10 to lock sub-base 2 in its desired position along tracks 57.

Catch members 18 of the locking mechanism for front wall 14 of the box structure are slightly tapered in a direction such that, as they are forced increasingly into the slots 58 in end walls 11 and 12, the front wall is pressed backwardly against the blocks 5. Thus, as handle 15 is operated toward the right as seen in Figs. 1 and 2, the front wall moves against the blocks 5. It is necessary or desirable that wall 14 firmly engage against the blocks 5 to retain the blocks in position, but it is not necessary that any appreciable force be exerted by the wall against the blocks. When the handle is properly positioned, wing bolt 19 may be tightened against wall member 14 to hold the handle in position. Several slots 58 may be provided in the end walls to permit the box structure to accommodate blocks of several thicknesses. The blocks are shown to fit closely within the end walls 11 and 12, but this fit should not be so tight as to require force to fit the blocks in place, yet, at the same time, sufficiently tight as to substantially eliminate the possibility of shifting of the blocks through any appreciable distance.

When the blocks 5 are fitted into position in the box structure, the crushing cylinders 47 and 48 may be forced downwardly through the blocks thereby to form a rectilinear shape or shapes according to the cylinder arrangement and the block arrangement. In Fig. 2 the cylinders are shown in fragment vertically removed above the normal upper position for the cylinders. Rods 29 are seen to extend between the cylinders, that is outside of the inner cylinder and inside the outer cylinder, in position to retain the ejector or hold-down ring or annular plate, which is shown at 31 in Fig. 1, at about the level of the lower blunt edge of the increased thickness portion 50 of the outer cylinder. As explained hereinabove, the lower blunt edge of the inner cylinder is preferably disposed at the same level as the lower edge of the outer cylinder, and a central, circular ejector or hold-down plate is retained by coaxial rod 33 at about the same level within the inner cylinder.

Downward motion of the cylinders will cause their lower edges to contact the blocks 5 along the concentric circles indicated by broken lines 59 and 60, respectively. These circles define the transverse configuration of the shape or shapes which are formed as the cylinders are forced rectilinearly downwardly through the blocks 5. It will be understood that various configurations of hollow crushing members 47, 48 may be employed to form various corresponding rectilinear shapes. As used herein the term "rectilinear" as applied to a crushing member means that every incremental portion of the walls of the member lies directly in line with a corresponding portion of the crushing edge. Thus, assuming that the crushing member is to be moved exactly vertically downwardly to form a path through the work block, every small portion of the wall which may enter the block lies vertically above some portion of the lower crushing edge. Upper portions of the crushing members which do not enter the work block may, of course, comprise portions extending out of rectilinear alignment. Specifically, if mounting head 46 were considered to be a part of crushing cylinder 48, it would be immaterial that the head 46 extends inwardly and outwardly out of rectilinear vertical alignment with any portion of the crushing edge 50. The rectilinear movement of the crushing member must correspond to the rectilinear shape of the member or, in other words, such movement must be in a direction in which all portions of the member walls are displaced from the crushing edge. In the specific embodiment herein shown, the machine is arranged to form hollow cylindrical shapes from the blocks 5. If one solid block is positioned in the box structure, on the table surface of member 20, a one-piece hollow cylinder would be formed. It is preferred, however, in the present instance, to form longitudinally split hollow cylindrical shapes, and this is accomplished by placing two blocks 5 in the box structure. The shapes then formed from the blocks are split hollow cylinders in accord with Fig. 3, and such cylindrical shapes are useful in pipe insulation. If each of the blocks 5 is 4 inches thick, 12 inches high and 18 inches long, three split shapes, 5 inches in diameter and 12 inches long, in accord with Fig. 3, may be formed by three separate crushing or forming strokes of the cylinders 47 and 48 along the confronting faces of the blocks, whereby a top view of the blocks following the forming of three such split cylindrical shapes will accord with Fig. 4. If the blocks are turned around, or reversed, they may next be positioned in the box structure to present the top appearance of Fig. 5, and two more split cylindrical shapes may be formed as suggested by broken lines 61 and 62. The shapes so formed may have an internal diameter, for example, of 3 inches, whereby the shapes of Fig. 3 form a 12 inch long pipe insulating section for pipe or tube having an outside diameter of about 3 inches, or a little less. The two semi-cylindrical shapes of this section are, of course, separated one from the other for positioning on the pipe to be insulated, thereafter being wrapped together with tape or cloth material, or held together with straps, as desired and appropriate. If it is desired to form split hollow cylindrical shapes suitable for insulating pipes of 5 inch outside diameter, a third cylinder, having a diameter of approximately 7 inches, but in other respects similar to cylinders 47 and 48, may be arranged coaxially outside of cylinder 48 and an additional ejector ring or annular plate similar to ring 31 may be provided externally of cylinder 48 and internally of the added 7 inch forming cylinder. It will be understood that additional rods similar to rods 29 be required to retain the additional ejector ring in position, and that the cylinder mounting plate 46 should then be of increased diameter and should have an additional annular groove. A cutting stroke with the 3 cylinders, of 3, 5, and 7 inch diameters, respectively, will form, in addition to the 3 inch internal and 5 inch external diameter shape, a second shape having a 5 inch internal diameter and 7 inch external diameter. It is, therefore, possible to obtain insulating sleeve members for 5 inch outside diameter pipe and insulating sleeve members for 3 inch outside diameter pipe at one operation and with a minimum waste of material. In a similar manner, an additional crushing or forming cylinder may be positioned internally of the 3 inch diameter cylinder 47, and if such innermost cylinder is of 1 inch diameter, the plug, which would be within the circle 59 of Fig. 2, and which might otherwise be discarded as waste, will be formed into an insulating sleeve for pipe of about 1 inch outside diameter. A simple geometric plan for forming sleeves from blocks 5 of various dimensions to provide sleeves for use with particular pipes permits the arrangement of several coaxial forming cylinders of the appropriate sizes to form those sleeves which are needed, with minimum waste of material. In this discussion it has been assumed that the wall thickness of the insulating sleeves should be about 1 inch, but it will be understood that sleeves of greater or less thickness are readily produced by appropriate proportioning of the crushing cylinders. The dimensions suggested are, of course, exemplary only, and various numbers and sizes of coaxial crushing cylinders may be employed as dictated by the size and wall thickness of the insulating sleeves which are to be formed. It will also be understood that, while the blocks 5 are shown with the greater dimension horizontal, they may be positioned to rest on one end on the table surface provided by member 20, and that the crushing cylinders may pass through the 18 inch block dimension to form split cylindrical shapes 18 inches long. If the forming stroke of the cylinders is intended to produce shapes 18 inches long, the cylinders 47 and 48 may be approximately 20 inches in overall height, whereas 14 inch cylinders are sufficient to form sleeve shapes 12 inches long. Blocks of other dimensions may be employed and, if a sleeve is desired which is longitudinally split into two halves, the detent pin 7 is adjusted into an appropriate opening 55 in accord with the block thickness dimension so to position the confronting walls of the two blocks 5 as to intersect the axis of the cylinders 47, 48. In adjusting the box structure to dispose different portions of the blocks below the cutting cylinders, thereby to cut one after another of the cylinders from the blocks as suggested by Figs. 4 and 5, the sub-base 2 is moved along base 1, by means of rollers 3 and tracks 57, and detent pin 8 is positioned in an appropriate selected one of openings 10 to lock the structure in its desired position for the forming stroke.

It has been found that by providing crushing members such as cylinders 47 and 48 with lower wall portions of increased thickness the frictional resistance of the foam glass material tending to oppose movement of the cylinders therethrough is greatly reduced, and that, furthermore, the few thousandths of an inch of clearance of the major portion of the cylinders, above the lower portions, prevents breakage which seems to occur from very slight horizontal bending or misalignment of the cylinders during either upward or downward cylinder motion.

The lower portions of the crushing cylinders are preferably not more than about 60 thousandths of an inch thick. With thick crushing edges which crush out greater amounts of material, smaller percentages of the crushed material can be deposited into the cellular material along the crush path and a greater amount builds up ahead of the crushing edge. This build up causes the crushing edge to be unstable in action as the built up materials shift in size, shape and compactness. Wide crushing edges furthermore increase the force necessary and thus increase the bending of the supporting table 20. At the same time, thin crushing edges require even thinner major wall portions for the cylinders, and thin walled cylinders are less rigid and tend to become slightly oval or otherwise out of shape, in addition to being difficult to manufacture and subject to damage. Cylinders of about 15 thousandths of an inch wall thickness with about 25 thousandths of an inch cutting edge thickness have been found reasonably satisfactory but somewhat more subject to wear at the cutting edge than cylinders of greater wall thickness. The greatest efficiency and overall satisfactory performance has been found to result with cylinders having upper wall portions between about 0.5 and 0.9 of the thickness of the lower cutting edge portions thereof. The specific cellular glass material for which the dimensions suggested have been found satisfactory has a specific gravity of about 0.15.

It is important to the proper operation of the machine of this invention that the forming cylinders move as nearly rectilinearly as possible throughout the crushing stroke. It will be apparent that this direction should be in the vertical plane established by the confronting faces of the blocks when split shapes are to be formed, whereby the shapes, such as the hollow cylindrical shape shown in Fig. 3, may be divided exactly in half. It has also been found that less danger of breakage of the blocks, and of the shapes formed from the blocks, exists when the direction of motion of the crushing cylinders is exactly perpendicular to the plane of the block supporting table. A modified construction of the upper portion of the machine is shown in Fig. 6 which permits a somewhat more accurate positioning of the compressed-air-actuated piston and cylinder and which provides additional means for retaining the piston rod in alignment throughout the operative stroke.

As shown in Fig. 6, a frame member 63, in the form of an I-beam with horizontal web, is arranged to carry the compressed air cylinder. An elongated rectangular plate 64 lies between the vertical flanges of frame member 63 and above and against or closely adjacent the horizontal web. Several bolts 65 extend upwardly through the web of the frame member 63 and thread into plate 64, thereby to retain the plate in position and to urge the plate downwardly toward the web. Opposing the action of bolts 65 are a like number of adjusting bolts 66. Preferably, a bolt 66 is located immediately adjacent each bolt 65. The bolts 66 are threaded downwardly through plate 64 and bear against the upper surface of the web of beam 63. It will be understood that the bolts 66 may be used to raise desired portions of plate 64 above the web, thereby to permit levelling adjustments. Each bolt 66 may carry a lock nut as shown.

A circular plate 67 is rigidly affixed in spaced relation to plate 64, the plates being spaced by sleeves 68 and being held firmly against respective opposite ends of sleeves 68 by means of bolts 69, which are shown as having heads below plate 67 and threaded ends engaged in plate 64. Sleeves 68 are sufficiently long to space plate 67 slightly below the lower edges of the flanges of beam 63. Adjustments to the position of plate 64 by means of bolts 65 and 66 correspondingly affect the position of plate 67.

The plates 64 and 67 have central round openings to pass hollow piston rod 70, and a corresponding and aligned round opening is provided in the web of beam 63.

Cylinder 71 is arranged with its lower edge disposed in an annular groove in the upper surface of plate 64 and with its upper edge disposed in a similar groove in the under surface of head closure member 72. A plurality of rods 73 may be arranged about cylinder 71 and threaded into plate 64 to hold down head member 72 by means of nuts 74.

The piston 75 is fixed on the hollow piston rod 70, and the rod 70 extends outwardly of the cylinder 71 in a downward direction through plate 64. A pressure seal 76 is arranged about the piston rod adjacent plate 64 to seal the chamber below the piston against the escape of compressed air, which may be furnished through opening 77 in the cylinder wall. Immediately adjacent sealing ring 76 is a bushing 78 in which the piston rod slides and which is provided to retain the piston rod in proper location at the plate 64. It will be understood that ring 76 and bushing 78 are fixed to plate 64 by an annular upward projection 79, which may be, for example, welded to the upper surface of plate 64.

The portion of piston rod 70 which extends above the piston 75 extends through a central opening in head member 72 and through a bronze bushing 80 held in predetermined position on member 72. A closed cylindrical extension 81 is fixed to the upper face of head member 72, and the upper end portion of the piston rod extends up through bushing 80 into the cylindrical extension of the cylinder. The stationary, vertical and coaxially extending rod 82 is threaded into the top end wall 83 of extension 81, and the opposite end of rod 82, which extends below the lower end of hollow piston rod 70, is arranged to carry an inner or central ejector plate which, as described in connection with Fig. 1, is provided to eject or hold down the waste formed within the inner crushing cylinder in operation of the machine.

Compressed air is introduced through opening 84 in the cylinder head 72 to effect the downward crushing stroke of the machine, and to prevent the escape of the compressed air above piston 75, a pressure seal 85 is arranged internally of the extreme upper end of the hollow piston rod to seal against the outer surface of vertical rod 82. Adjacent the pressure seal 85, and also bearing against the outer surface of rod 82, is a metal bushing 86. A similar metal bushing 87 is arranged within the piston rod 70 to bear against the inner rod 82 adjacent the piston 75, and an additional bushing may be provided adjacent the lower end of the piston rod if desired. The upper end of central rod 82 is rigidly affixed in position by attachment to the cylindrical extension 81. The rod tends, accordingly, to retain the upper end of the piston rod 70 in desired aligned position through the connecting bushing 86, particularly when the piston is toward its upper position. Bushing 80 serves to retain the piston rod 70 in alignment at the level of head 72, and when the piston is toward the lower end of its stroke, bushings 80 and 86 together tend to cause rod 82 to be properly aligned at this level. As the piston approaches its lower position, also, the bushing 87 cooperates with bushing 78 to align the central rod 82 at about the level of plate 64. Bushings 78 and 80, at opposite ends of cylinder 71, combine to retain the piston rod 70 in proper alignment, and these bushings tend to increase and maintain the accuracy of alignment of inner rod 82, while rod 82 tends further to maintain the proper alignment of piston rod 70.

Circular ejector rod carrying plate 88, having depending rods 89, is shown in Fig. 6 as being bolted to the underside of plate 67, short sleeves 90 being interposed to space plate 88 slightly below plate 67, thereby to accommodate the heads of rods 89. Several threaded openings 91 may be provided in plate 67 to accommodate attachment bolts for plates 88 of greater or less diameter than that shown, it being understood that the diameter of plate 88, and the number and positioning of rods 89 in connection with the plate, are related to the diameter and number of crushing cylinders to be employed, and, accordingly, to the number and dimension of concentric shapes which are to be formed at each stroke of the machine. A threaded lower end 92 is provided on piston rod 70, to which a crushing-cylinder-carrying plate 93 may be affixed directly as shown in Fig. 6, or through interposed collars such as are shown at 44 and 45 in Fig. 1. The plate 93 is shown as having three concentric crushing cylinder receiving grooves in its lower face, and forming cylinders 94, 95 and 96 are respectively disposed and anchored in these grooves, the lower portions of the cylinder being omitted since each is formed in accord with the forming cylinders 47 and 48 heretofore shown and described. It will be understood that the outer rods 89 support an ejector ring peripherally within cylinder 96 and outside of cylinder 95, while a similar smaller ejector ring is supported by the inner rods 89 peripherally inside cylinder 95 and outside of cylinder 94. These ejector rings are positioned, like ring 31 of Fig. 1, at about the level of the lower edges of the forming cylinders, with the cylinders in raised position, as heretofore described. A downward stroke of the cylinders 94, 95 and 96 through blocks of material arranged as in Fig. 2 will produce three concentric cylindrical severed paths through the blocks of material, and upon withdrawal of the forming cylinders, two split hollow cylindrical shapes, comprising two pipe insulating sections of different internal diameters, and one central, non-hollow, split, waste cylinder will remain in the blocks, having been ejected from the forming cylinders, by being held down toward the table surface, by the action of the ejector rings supported by rods 89 and by the central ejector plate supported by axial rod 82. The two insulating sections may be removed by releasing the blocks from the box structure, it being understood that the box and flat table structure of Figs. 1 and 2 is provided in the modified machine of Fig. 6, and, additionally, that a suitable compressed air system like that of Fig. 1 is also applicable to the cylinder 71 to operate piston 75.

The product produced by the Fig. 6 machine with three forming cylinders will comprise a large insulating section, formed between crushing cylinders 95 and 96, cylinder 96 forming the outer surface of the section and the crushed path of cylinder 95 forming the bore of the section, and a smaller section formed from the material removed internally from the large section, by cylinders 95 and 94. In the forming of large diameter sections, for insulating 5 or 7 inch pipe, for example, an important saving in material results, and it is possible, when forming a section for 7 inch pipe, to form at the same time, from the material removed internally to form the bore of such section, a section for 5 inch pipe, and further to form from the material severed internally from that section, a section for 3 inch pipe, and internally thereof, a section for 1 inch pipe, discarding, accordingly, only the 1 inch diameter waste cylindrical shape formed at the center and severed from the internal bore of the smallest diameter section. Five concentric crushing or forming cylinders would be required for the particular operation suggested if the outer section is to have a cylindrical outer surface. The wall thickness of the insulating shapes so formed may be a full inch in thickness if the forming cylinders are sufficiently thin, since pipe wall thicknesses increase with pipe size. If the forming cylinders are thicker, however, the wall thickness of the insulating sections may be very slightly less than one inch. Of course, shapes having one-half inch or three inch thick walls, or walls of other dimensions, may be desired and can be formed in the same manner. It will further be understood that other rectilinear shapes may be produced with the present machine by providing crushing or forming members of other than cylindrical shape and by various combinations. Insulating sections which are externally square and internally round in cross section are, for example, readily obtainable.

While we have shown and described only certain preferred embodiments of our invention by way of illustration, many modifications will occur to those skilled in the art, and we therefore wish to have it understood that we intend, in the appended claims, to cover all such modifications as fall within the true spirit and scope of our invention.

What we claim as new and desire to secure by Letters Patent of the United States is:

1. The method of producing rectilinear shapes of brittle, cellular, foam glass material which comprises, placing a foam glass block having a flat lower surface on a generally horizontal, rigidly flat table surface, forcing downwardly in a direction perpendicular to said surface, a hard, hollow, thin-walled, open-bottom, rectilinear forming member having a blunt lower leading edge through said blank, thereby to crush the foam glass material in the path of the lower edge of said forming member, and withdrawing said forming member upwardly perpendicularly of said surface while holding down the shape formed by said crushed path.

2. The method of producing a split, hollow, pipe insulating, cylindrical sleeve of brittle, cellular material which comprises placing two rectangular blocks of said cellular material with two respective side faces together upon a rigidly flat table surface, and forcing a pair of coaxially disposed hollow, thin walled cylindrical forming members of respectively different diameters and having blunt lower leading edges downardly, rectilinearly and substantially perpendicularly of said surface through said blocks with the common axis of said cylinders in the plane of said faces.

3. A machine for forming rectilinear split, hollow cylindrical shapes from brittle, cellular foam glass blocks having flat bottom surfaces, comprising: a rigidly flat, non-resilient, stationary table member for supporting said blocks on their bottom surfaces, an upstanding, hard, thin walled crushing tool of hollow, rectilinear shape, the wall edge at the lower end of said tool being blunt, of increased thickness, and parallel to said table member, and the wall surfaces of said tool extending perpendicularly to said table member, a carrying member affixed to an upper portion of said tool, double acting means connected to said tool-carrying member forceably to move said edge downwardly toward said table and sequentially upwardly away from said table member in directions perpendicular to said table member, and hold down means to restrain severed portions of said blocks against rising with said tool upon said upward motion thereof.

4. A machine for forming hollow cylindrical shapes from blocks of predetermined height having flat lower surfaces and composed of brittle cellular foam glass material, comprising: a rigidly flat, horizontal, non-resilient ly surfaced table; a pair of vertically and coaxially disposed hard, thin walled, hollow, crushing cylinders of at least said height having respectively different diameters and having blunt lower wall edges, a lower minor fractional portion of the wall of each said crushing cylinder including said lower wall edge of each being of internally and externally increased wall thickness; means to force said cylinders axially downwardly toward said table surface and subsequently selectively to force said cylinders upwardly away from said table surface; ejector means comprising an annular member disposed between said inner and outer cylinders and a member within said inner cylinder; said force means comprising a hollow rod and an attached apertured plate connecting said rod and cylinders; supporting means for said annular member comprising a rod extending through an aperture of said plate; and supporting means for said inner cylinder ejector member comprising a rod extending from said last member through and beyond the far end of said hollow rod; said ejector members being disposed approximately equally spaced by at least said height above said table surface, and said force means being operative to move said cylinder lower wall edges downwardly from approximately the level of said ejector members substantially to meet said table surface and sequentially upwardly to said level.

5. In a machine for producing elongated, brittle foam glass shapes, the combination with a foam glass blank supporting table of: an upright hollow forming cylinder having a major portion with a wall thickness between about 20 and 40 thousandths of an inch and a minor lower edge portion, including a blunt lower edge, with a thickness at least about 10 percent greater than said major portion wall thickness, force means selectively and consecutively to force said blunt lower edge in a direction axially of said cylinder toward said table through a foam glass blank on said table and to withdraw said edge from said blank in the opposite direction, and means to retain a severed portion of said blank substantially in its original position during said withdrawal, said minor portion of increased wall thickness having a height which is a minor fraction of the height of the foam glass blank to be operated upon.

6. A machine for severing rectilinear shapes from brittle, cellular foam glass blocks, comprising a flat surfaced, rigid supporting member for said blocks, a thin walled crushing tool of hollow, elongated rectilinear shape having a mounting end and a crushing end, said wall being of increased thickness toward said crushing end, power means mounting said tool at said mounting end and operative to reciprocate said tool longitudinally toward and away from said surface of said member, said crushing end having a blunt, unbevelled, operative crushing edge.

7. The method of forming rectilinear shapes from a brittle, cellular foam glass material block which comprises the steps of placing said block in firm contact with a rigid conforming supporting surface, and forcing through said block a rectilinear, thin walled crushing tool having an unbevelled, blunt leading edge, said tool moving forwardly through said block in a straight path in said rectilinear direction, thereby to form a crushed path conforming in shape to the path of said leading edge through said block.

References Cited in the file of this patent

UNITED STATES PATENTS

| 126,295 | Hidden | Apr. 30, 1872 |
| 156,558 | Frantze | Nov. 3, 1874 |
| 176,217 | Collins | Apr. 18, 1876 |
| 398,139 | Eaton | Feb. 19, 1889 |
| 2,191,709 | Dedrick | Feb. 27, 1940 |
| 2,568,284 | Harrison | Sept. 18, 1951 |
| 2,666,123 | Blackman | Jan. 12, 1954 |

FOREIGN PATENTS

| 43,646 | Germany | June 23, 1888 |
| 21,083 | Australia | Feb. 25, 1936 |